United States Patent [19]

Oguro et al.

[11] Patent Number: 5,046,247

[45] Date of Patent: Sep. 10, 1991

[54] METHOD FOR MANUFACTURING HEAT TRANSFER MODULE WITH HYDROGEN ADSORPTION ALLOY

[75] Inventors: Keisuke Oguro; Hiroshi Ishikawa; Hiroshi Suzuki; Akihiko Kato; Teruya Okada; Shizuo Sakamoto, all of Osaka, Japan

[73] Assignees: Agency of Industrial Science & Technology, Tokyo; Kurimoto Ltd., Osaka, both of Japan

[21] Appl. No.: 393,933

[22] Filed: Aug. 15, 1989

[30] Foreign Application Priority Data

May 10, 1989 [JP] Japan .................................. 1-116572

[51] Int. Cl.$^5$ .............................................. F17C 11/00
[52] U.S. Cl. ............................. 29/890.032; 29/890.03; 165/104.12
[58] Field of Search ............. 165/104.12; 29/157.3 R, 29/428, 890.032, 890.03; 427/443.1, 437; 419/35, 64

[56]  References Cited

U.S. PATENT DOCUMENTS

| 4,393,924 | 7/1983 | Asami et al. ................... 165/104.12 |
| 4,609,038 | 9/1986 | Ishikawa et al. ................ 165/104.12 |
| 4,674,563 | 6/1987 | Maier-Laxhuber et al. ..... 165/104.12 |
| 4,819,717 | 4/1989 | Ishikawa et al. ................ 165/104.12 |
| 4,819,718 | 4/1989 | Ishikawa et al. ................ 165/104.12 |

FOREIGN PATENT DOCUMENTS

| 0258996 | 11/1987 | Japan ............................. 165/104.12 |
| 3034487 | 2/1988 | Japan ............................. 165/104.12 |

Primary Examiner—Irene Cuda
Attorney, Agent, or Firm—Jones, Tullar & Cooper

[57] ABSTRACT

This invention relates to a method for manufacturing a heat transfer module to improve the thermal efficiency of a hydrogen adsorption alloy. The hydrogen absorption alloy particles are coated with a metal which is different from that of the alloy, followed by the formation of a compact with the coated particles. The compact so formed has a substantially uniform specific gravity. The compact is then inserted in a pipe mode of a metal which is different from that of the alloy. The pipe has an internal diameter which is a function of the diameter of the compact and the free expansion coefficient of the compact. The method will improve the usefulness of hydrogen adsorption alloy in practical use.

2 Claims, 3 Drawing Sheets

METHOD FOR MANUFACTURING HEAT TRANSFER MODULE WITH HYDROGEN ADSORPTION ALLOY

BACKGROUND OF THE INVENTION

1. Field of the Invention

The present invention relates to a method for manufacturing a heat transfer module with a hydrogen adsorption alloy mainly composed of metal hydride.

2. Prior Art

Hitherto, in the prior art there has been developed in which hydrogen is adsorbed certain metals or alloys to be stored therein and transferred therefrom in the form of a metal hydride. This prior art has been further applied to such practical use as purification of hydrogen, pressure rise, heat pumps, air-conditioning systems, etc.

In such a practical application, because an exothermic reaction or an endothermic reaction takes place necessarily at the time when the metal hydride adsorbes or discharges hydrogen, such a property can be utilized in a heat exchanger, heat pump, etc.

When it is desirable to store or transfer hydrogen, the delivery of hydrogen is not effectively performed without a rapid exchange of heat between the metal hydride and the outside, from the viewpoint of high thermal efficiency, and efficient storage and transfer of hydrogen.

However, the thermal conductivity of the hydrogen adsorption alloy itself, in the form of particles a is not high, and therefore several attempts have been proposed aiming at efficient delivery or exchange of heat.

According to one of such proposed attempt, for the purpose of improving the hydrogen adsorption alloy itself, surfaces of the particles are plated with a different kind of metal of high thermal conductivity.

According to another attempt, the structure of the heat exchanging unit is improved so that a hydrogen adsorption alloy in the form of particles is brought as close as possible into contact with a heat transfer element. For that purpose, inner and outer peripheries of a heat transfer pipe are provided with fins, for example.

According to a still further attempt, compression molding is employed.

FIG. 6 shows an embodiment of example U.S. Pat. No. 4,609,038 of which patentee is the applicant, and in which a heat exchanging unit is manufactured by the steps of coating fine particle surfaces of hydrogen adsorption alloy with a different kind of metal by plating, compressively molding them to obtain a hydrogen adsorption alloy compact 7a, providing through holes through the compact, inserting a heat exchanging pipe 8a in the through holes to be in direct contact with the holes, thereby ends of the pipe may communicate with a supply port and exhaust port for heating or cooling medium respectively.

However, there still remain several problems to be solved in the foregoing prior arts respectively.

In the attempt of improving hydrogen adsorption alloy itself to enhance its thermal conductivity, there is a restriction in terms of distance within which heat can be transferred from a heat transfer surface, because thermal conductivity of the hydrogen adsorption alloy is essentially low when it is in the form of particles. By the same reason, satisfactory improvement in thermal conductivity is not achieved, either, even if a large number of fins are densely installed for rapid delivery of heat.

In the attempt of compressively molding the particles into a compact, it is certain that thermal conductivity of the hydrogen adsorption alloy in the form of a compact is significantly improved as compared with the alloy in the form of particles or powder, but a further problem still exists in how to make close contact between the heat transfer element and the hydrogen alloy compact. For example, in the arrangement of a heat exchanging unit forming a compact of alloy by compression molding as illustrated in FIG. 6 and inserting several heat transfer pipes (of copper) through the compact, it is necessary to provide through holes for such insertion of the heat transfer pipe, and therefore whether or not a close contact is attained between the external surface of the pipe and the alloy compact is a key in this arrangement.

In the heat transfer module in which the external surface of a heat transfer pipe is exposed to a heating medium and a cylindrical hydrogen adsorption alloy compact is inserted inside the pipe to be in contact with the internal surface of the pipe, there is the same problem as above.

As is well known, the hydrogen adsorption alloy essentially expands when adsorbing hydrogen gas and producing metal hydride, and contracts when exhausting hydrogen gas. Particles of hydrogen alloy are formed into a compact for the purpose of improving thermal conductivity and preventing the particles from micronization and scattering due to repeated contraction and expansion thereof in the use. With such formation into a compact, relation between the compact and heat transfer pipe becomes delicate and complicated. More specifically, when establishing the true specific gravity of the hydrogen adsorption alloy as 1, then the bulk specific gravity of the alloy in the form of particles is in the range of 0.37 to 0.39 which is naturally smaller than the true specific gravity. The specific gravity increases when formed into a compact by compression molding. For example, the specific gravity of the alloy compact is in the range of 0.64 to 0.65 when formed under pressure of 2 Tons/cm$^2$ applied by cold isostatic press (hereinafter referred to as "CIP").

In the reaction between the alloy compact and hydrogen gas without any restriction, the expansion of volume mounts to 141% when the alloy is made of $LaNi_{4.95}Al_{0.5}Cu$, and 123% when the compact is made of $MmNi_{4.3}Al_{0.7}Cu$. The expansion coefficient is largely different depending upon the kind of alloy as mentioned above. Even in alloys of the same kind, their expansion coefficients may be largely different from each other just by reason of a little difference in the content of Al, thus the conditions to be established between the compact and the heat transfer pipe are very delicate and intricate. That is to say, if a hydrogen adsorption alloy compact to be inserted in a heat transfer pipe is permitted to expand freely in the pipe, the strength of the compact is lowered bringing about collapse, micronization and scattering thereof, eventually impairing the advantage of having been formed into a compact. On the other hand, if there remains some gap between the heat transfer pipe wall and the inserted compact after the expansion, an undesirable heat insulating layer (space) is formed therebetween resulting in a serious decline of thermal efficiency.

On the contrary, if expansion of the alloy compact is excessively restricted, the heat transfer pipe is deformed or the compact is destroyed due to the physical stress resulting from such restriction further resulting in collapse of the compact.

SUMMARY OF THE INVENTION

The present invention was made to solve the above-discussed problems and has an object of providing a method for manufacturing a heat transfer module with hydrogen adsorption alloy whose thermal efficiency is high and which is effective for prevention from deterioration due to repeated use.

To accomplish the foregoing object, in the method for manufacturing a heat transfer module according to the invention, hydrogen adsorption alloy particles whose surfaces are coated with a different kind of metal are formed into a cylindrical compact having a diameter D by compressively molding the particles until the formed compact comes to have an almost uniform specific gravity, then the compact is inserted in a pipe of a different kind of metal, the pipe having an internal diameter in the range of $$D_0 = D \times \sqrt[3]{\frac{91}{100} \times E}$$

to $$D \times \sqrt[3]{\frac{95}{100} \times E}$$

with respect to free expansion coefficient E of the compact.

It is preferable that the coating of the surfaces with a different kind of metal is carried out by autocatalysis type wet electroless plating with a reducer. It is also preferable that a flexible ring is placed between one compact and the other when a plurality of compacts are inserted in the pipe.

When coating the surfaces of the hydrogen adsorption alloy particles with different kinds of metal, the surfaces are encapsulated, thereby enhancing thermal conductivity and improving surface strength, and as a result there is no easy micronization of the particles in spite of repeated expansion and contracting in the process of reaction with hydrogen. When compressively molding the particles whose surfaces are treated as mentioned above, the strength of the compact obtained is significantly improved because the different kinds of metal themselves applied to the surfaces of the particles are in contact with one another and the particles are closely consolidated due to strong compaction. Density of the compact thus obtained is larger with an increase of the applied pressure, and once reaching a certain value, there is an almost invariable limit irrespective of the extent of the pressure application. This threshold value varies dependent upon the apparatus for applying pressure, the components of the hydrogen adsorption alloy and other conditions, but a certain preferable value can be specified.

The compact whose diameter D is then inserted in the pipe of a different kind of metal has an internal diameter is in the range of $$D_0 = D \times \sqrt[3]{\frac{92}{100} \times E}$$

to $$D \times \sqrt[3]{\frac{96}{100} \times E}$$

(where E is free expansion coefficient of the compact).

The compact expands naturally when applying hydrogen gas to the compact inserted in the pipe as mentioned above, but expansion of the compact is restricted in the range of 4 to 8% in percentage by volume as compared with free expansion. Accordingly, though the external surface of the expanded compact is in press-contact with the outer wall of the metal pipe, there are no such disadvantages as generation of pores, deformation of the metal pipe or self-breakdown of the compact due to excessive internal stress, because the surfaces of the alloy particles are strengthened by coating with a different kind of metal to exhibit sufficient endurance. Since this surface-strengthened compact is in close contact with the metal pipe, without possibility of collapse, micronization of the compact or generation of pores which may occur in the event of free expansion, the compact is solidly held with the pipe and there is no possibility of sliding separation of the compact from the pipe even if the pipe is inclined. As a result, when incorporating the compact in a heat exchanger as one of the components thereof, the compact functions as an excellent heat transfer module of high thermal efficiency endurable over a long period of use.

The concept of forming hydrogen adsorption alloy into a compact for the purpose of improving thermal efficiency of hydrogen adsorption alloy and durability thereof as noted above is further developed according to the present invention by arranging a heat transfer module formed by inserting the compact in a heat transfer pipe on the optimum conditions. It is certain that the expansion coefficient of the alloy on reaction with hydrogen gas varies depending upon composition of the alloy or conditions of compaction and that it was not easy to establish a general principle covering these factors, but as a result of experiments, the inventors have found a common principle which has been then embodied into useful technical means according to the invention.

Other objects and advantages of the invention will become apparent in the course of the following description with reference to the accompanying drawings.

BRIEF DESCRIPTION OF THE DRAWINGS

In the drawings forming a part of the present application.

DESCRIPTION OF THE PREFERRED EMBODIMENT

Several methods for coating surfaces of hydrogen adsorption alloy with different kind of metal have been proposed, and among which coating by autocatalysis type wet electroless plating with a reducer is most desirable. This coating method was already disclosed by a part of the applicants in the Japanese patent application No. Sho 59-46161. When using formaldehyde as a reducer and mixing it with a copper solution for electroless plating by stirring, the plating proceeds while generating fine bubbles of hydrogen gas due to reaction in the solution and, as a result, a porous film layer of a copper coating having a large number of fine pores is formed. This porous film is advantageous not only in terms of an improvement of thermal conductivity and prevention from collapse and micronization but also in terms of exactly performing a hydrogen delivery function between the alloy compact and the outside in the same level as if the alloy were not formed into a compact but left in the form of particles.

Figure 1:
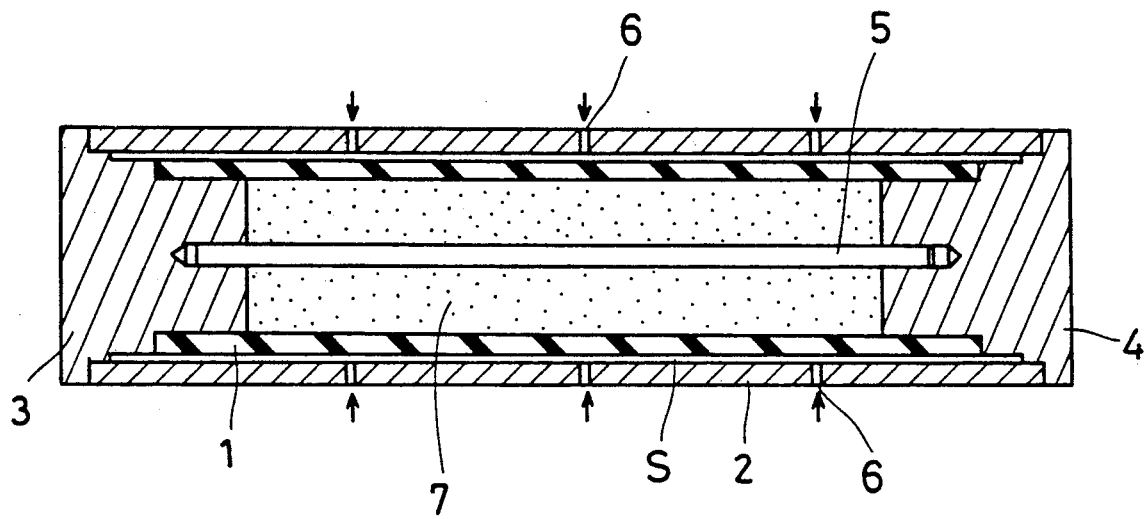
FIG. 1 is a front sectional view of a CIP mold used in an embodiment in accordance with the invention.
Figure 2:
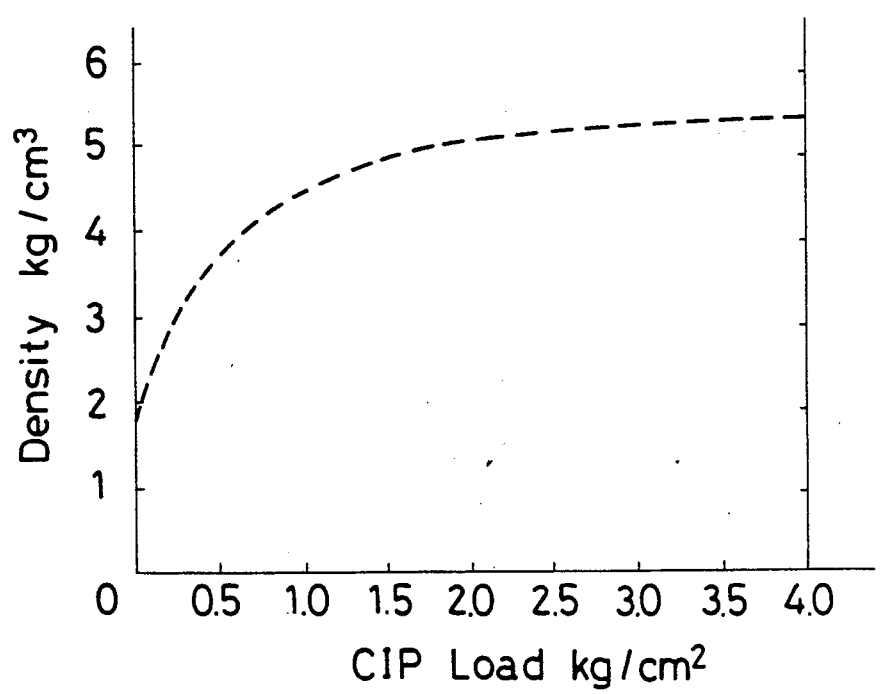
FIG. 2 is a diagram showing a relation between load of CIP and density of alloy.

Among a variety of methods for compressively molding the particles into a compact, the CIP mentioned above and shown in FIG. 1 is recommended. Referring now to FIG. 1 showing a sectional view of a mold for CIP used in the embodiment, an elastic cylinder 1 to be used in molding is covered with a protection cylinder 2 having through holes 6 with a gap S therebetween, and opposite ends of the cylinders are respectively closed with stainless steel caps 3, 4. A stainless steel core metal 5 is inserted in the center. Then, the hollow part (i.e., space) between the elastic cylinder 1 and the core metal 5 is filled with the surface-treated hydrogen adsorption alloy particles. After putting the caps 3, 4 on both ends, a hydraulic pressure is applied to this unit. The hydraulic pressure passing through the holes 6 provided through the protection cylinder 2 enters the gap S and compressively molds the particles into a compact 7 by evenly applying pressure from the whole periphery of the elastic cylinder 1. The specific gravity of the compact 7 is almost the same irrespective of kind of alloy, and simply increases in proportion to the pressure applied, i.e., with a hyperbolic relationship. However, there is a limit at a certain level and the line of the specific gravity is astringent maintaining an invariable value. FIG. 2 shows one example of this in which the load applied for compressively molding $LaNi_{4.7}Al_{0.3}Cu$ alloy with CIP and the density of the compact obtained thereby. As shown in FIG. 2, when the load with CIP exceeds 2.0 Tons/cm², the density (Kg/cm³) does not increase substantially, which means that application of a pressure of Tons/cm² is reasonable and economical. In any molding equipment other than CIP, a proper load to the apparatus can be specified.

The relation between the diameter D of the compact 7 obtained by compressive molding and the internal diameter $D_0$ of the metal pipe, in which the compact 7 is inserted, is particularly important, forming an essential requirement of the invention.

In the embodiment, alloy particles were plated with copper by the application of the aforementioned optimum load of 2 Tons/cm² with CIP, then formed into a compact by compressive molding. A plurality of cylindrical pieces each of 25.0 mm in external diameter, 6 mm in internal diameter and 250 mm in length were formed, then the outer periphery of each piece was cut by machining to be of smaller external diameter, resulting in the formation of test pieces Each of the test pieces was then inserted in a copper pipe of 25.00 m/m in internal diameter, and hydrogen gas was repeatedly applied to the pipe ten times for separate reactions. Table 1 shows a result of the respective reactions.

TABLE 1

| | Diameter A(m/m) | B (m/m) | C (m/m) |
|---|---|---|---|
| $LaNi_{4.95}Al_{0.05}$—Cu | 25.0 to 23.2 | 22.6 to 22.9 | 22.3> |
| $LaNi_{4.7}Al_{0.3}$—Cu | 25.0 to 23.6 | 23.1 to 23.4 | 22.7> |
| $LaNi_{4.6}Al_{0.4}$—Cu | 25.0 to 23.8 | 23.2 to 23.5 | 22.9> |
| $MmNi_5$—Cu | 25.0 to 23.1 | 22.5 to 22.9 | 22.3> |
| $MmNi_{4.7}Al_{0.3}$—Cu | 25.0 to 23.6 | 23.0 to 23.3 | 22.7> |
| $MmNi_{4.5}Al_{0.5}$—Cu | 25.0 to 23.9 | 23.3 to 23.7 | 22.9> |
| $MmNi_{4.3}Al_{0.7}$—Cu | 25.0 to 24.3 | 23.7 to 24.0 | 23.4> |

The left column of the above table shows two kinds of hydrogen adsorption alloys, i.e., lanthanum and misch metal alloys whose Ni is substituted for Al.

The result of the reactions is classified into three cases depending upon the range of the external diameter D of each compact. That is, when the external diameter D was in the range shown in column A, expansion of the alloy by the reaction was excessively large, and the alloy compact could not hold itself against the stress and collapsed, and otherwise the heat transfer pipe was enlarged or deformed impairing its function.

When the external diameter D was in the range shown in column B, i.e., in the range of expansion appropriately controlled, the external surface of the compact expanded desirably and was in tight contact with the internal surface of the heat transfer pipe. The compact itself was also well-controlled keeping its fine and dense compaction.

When the external diameter D was in the range shown in column C, i.e., in the range of almost free expansion, the external surface of the expanded compact did not reach the internal surface of the heat transfer pipe, thus leaving a gap therebetween, and therefore the thermal efficiency was considerably low, the compact itself was fragile due to the generation of pores and the compact was slidable when the pipe was inclined.

From the view point that there is a correlation between the values in columns A, B, and C and the content of Al contained in the alloy, the hydrogen reaction was repeated ten times on each of compacts the of the same external diameter, and the free expansion coefficient was measured.

Figure 3:
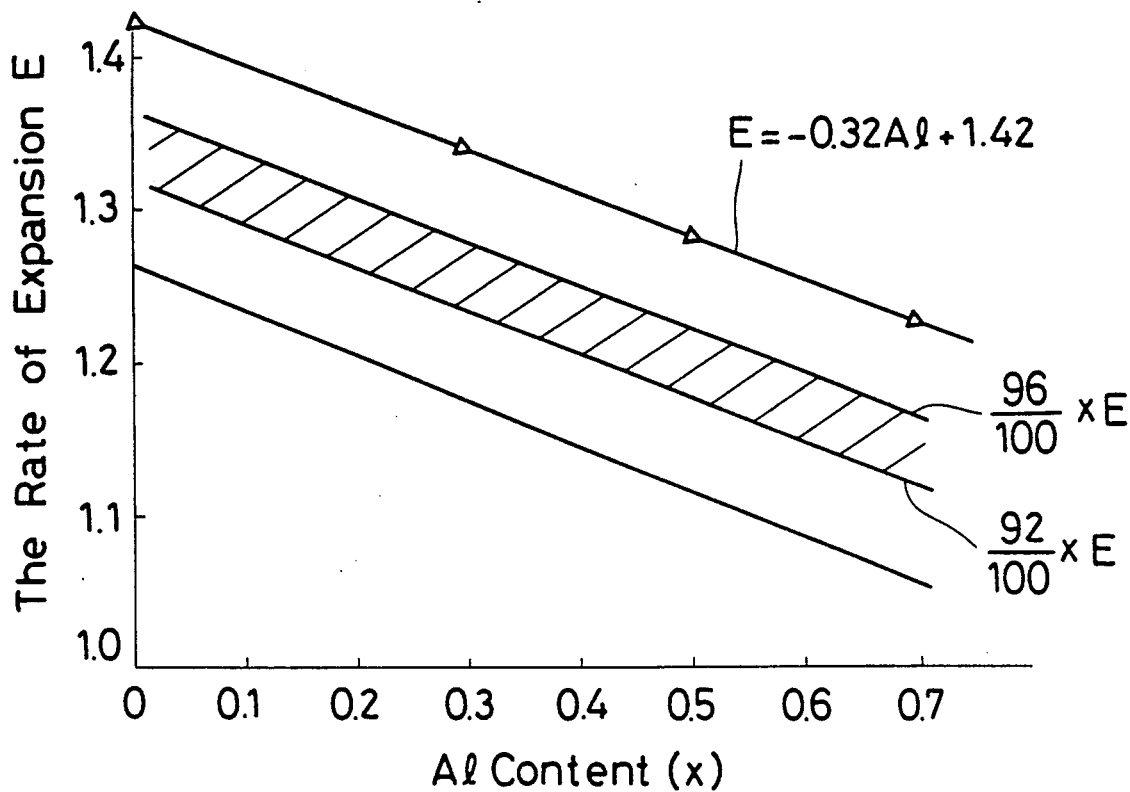
FIGS. 3 and 4 are diagrams respectively showing content of Al and free expansion coefficient.

FIG. 3 is a diagram shown in a result of the measurement of $LaNi_5-xAlX$, and in which the abscissa indicates the amount of Al substituted for a part of Ni in the range of X=0 to 1.0 and the ordinate indicates the free expansion coefficient E (volume %).

Figure 4:
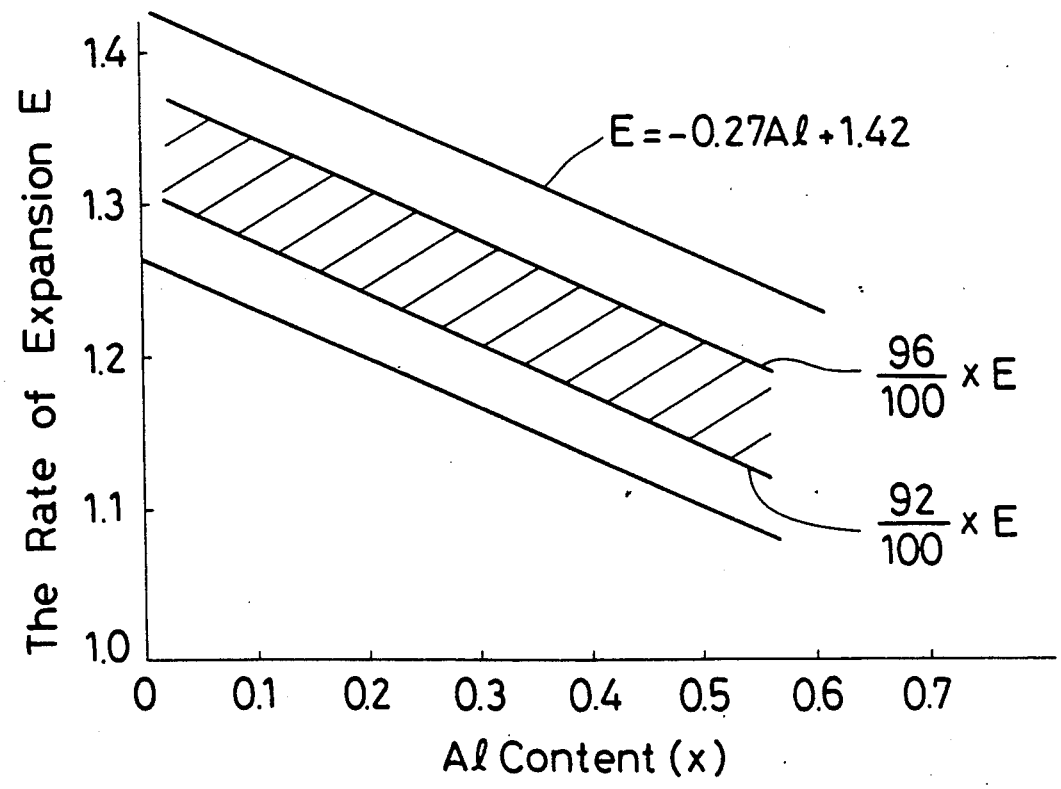

FIG. 4 is a diagram showing $MmNi_5-xAl_x$ in the same manner as FIG. 3.

It was found that with respect to lanthanum alloy, the results of the measurements were expressed substantially in the form of a primary linear expression of $E = -0.32Al + 1.42$ which extends downward to the right as shown in FIG. 3. With respect to misch metal alloy, the results of the measurements were also expressed in the form of a substantially primary linear expression of $E = -0.27Al + 1.42$ which extends downward to the right as shown in FIG. 4.

When combining the experimental values obtained from Table 1 with the experimental expressions of FIGS. 3 and 4, it is paradoxically acknowledged that the most desirable expansion coefficient with respect to the free expansion coefficient when the content of Al in lanthanum alloy is zero is expressed as follows:

$$\frac{22.7}{250} = \sqrt[3]{1.42} \times R$$

-continued $$R = \frac{0.91}{\sqrt[3]{1.42}} = 0.94$$

Accordingly, in this embodiment, with respect to lanthanum alloy, the optimum relation between the external diameter D of the alloy compact and the internal diameter D of the pipe of different kind of metal is expressed as follows:

$$D_0 = D \times \sqrt[3]{\frac{94}{100} \times (-0.32Al + 1.42)}$$

In the same manner, with respect to misch metal alloy, the optimum relation between the external diameter D and the internal diameter $D_0$ is expressed as follows:

$$D_0 = D \times \sqrt[3]{\frac{94}{100} \times (-0.27Al + 1.42)}$$

A preferable range in consideration of the above optimum relation is expressed, with respect to lanthanum alloy, as follows: that is, a range of $$D_0 = D \times \sqrt[3]{\frac{92}{100} \times (-0.32Al + 1.42)}$$

to $$D_0 = D \times \sqrt[3]{\frac{96}{100} \times (-0.32Al + 1.42)}$$

In the same manner, a preferable range in consideration of the above optimum relation is expressed, with respect to misch metal alloy, as follows: that is, a range of $$D_0 = D \times \sqrt[3]{\frac{92}{100} \times (-0.27Al + 1.42)}$$

to $$D_0 = D \times \sqrt[3]{\frac{96}{100} \times (-0.27Al + 1.42)}$$

Hatched areas in FIGS. 3 and 4 respectively show the above preferable ranges.

Figure 5:
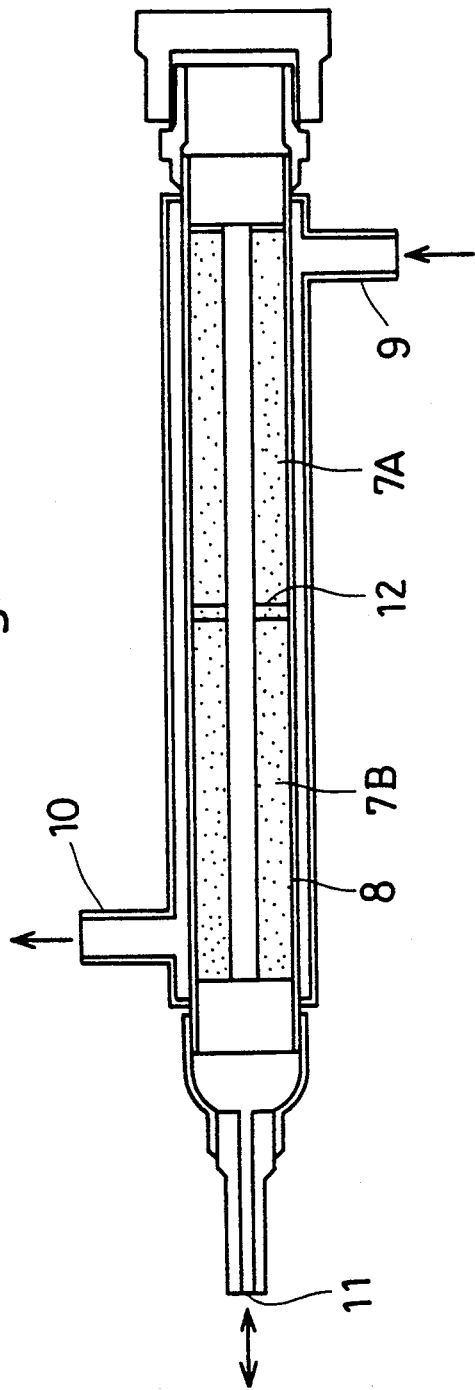
FIG. 5 is a front sectional view of an assembled heat transfer module.
Figure 6:
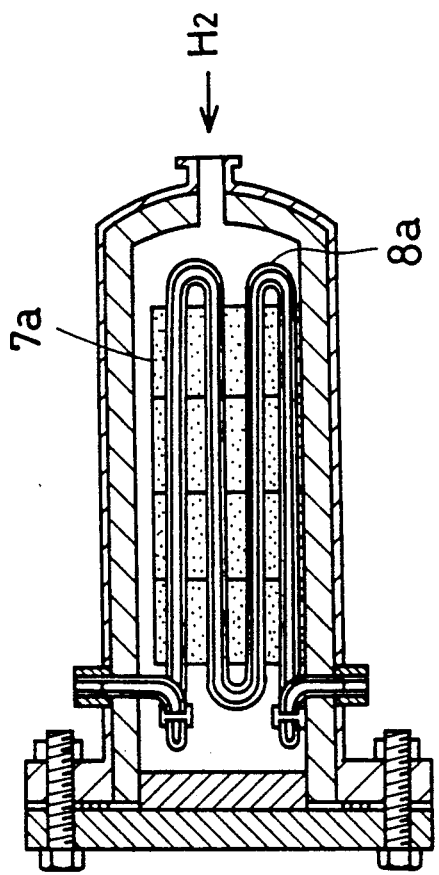
FIG. 6 is a front sectional view showing the prior art.

Referring to FIG. 5 showing a front sectional view of the embodiment wherein a transfer module is assembled into a heat exchanging unit according to the invention, the compact 7 forms a reacting element in firm and close connection with the inner wall of the heat transfer pipe 8, and adsorbs or discharges hydrogen gas according to the transfer of heat taken or given between the heating (or cooling) medium supply port 9 and the heating (or cooling) medium discharge 10. The reaction gas, passing through the gas passage 11, comes and goes between the apparatus and outside.

Because an elongated alloy compact is to be arranged it is preferable, for the sake of compaction working, that the alloy compact is divided into components 7A and 7B to be separately placed in the heat transfer pipe 8, then assembled by interposing a flexible ring 12 therebetween. Such material as foam styrene or the like is preferable as the flexible ring, which serves as a shock absorbing member when the compact expands or shrinks in the axial direction as a result of hydrogen reaction, and as a spacer grasping the compact so as not to get out of the module by compressing itself after completing the expansion.

What is claimed is:

1. A method for manufacturing a heat transfer module, comprising the steps of:
    coating hydrogen adsorption alloy particles with a metal different than the alloy;
    forming the coated particles into at least two cylindrical compacts by compressively molding the coated particles until the formed compacts have a substantially uniform specific gravity;
    inserting the cylindrical compacts into a pipe comprising a metal different than the alloy, said pipe having an internal diameter in the range of $$D_o = D \times \sqrt[3]{\frac{92}{100} \times E}$$

to $$= D \times \sqrt[3]{\frac{96}{100} \times E}$$

wherein:
    D = the diameter of the cylindrical compact; and
    E = the free expansion coefficient of the cylindrical compact; and
    placing a flexible ring between adjacent compacts.

2. A method for manufacturing a heat transfer module, comprising the steps of:
    coating hydrogen adsorption alloy particles with a metal different than the alloy by an autocatalysis type wet electroless plating with a reducer;
    forming the coated particles into at least two cylindrical compacts by compressively molding the coated particles until the formed compacts have a substantially uniform specific gravity;
    inserting the cylindrical compacts into a pipe comprising a metal different than the alloy, said pipe having an internal diameter in the range of $$D_o = D \times \sqrt[3]{\frac{92}{100} \times E}$$

to $$= D \times \sqrt[3]{\frac{96}{100} \times E}$$

wherein:
    D = the diameter of the cylindrical compact; and
    E = the free expansion coefficient of the cylindrical compact; and
    placing a flexible ring between adjacent compacts.

* * * * *